United States Patent
Kurihara

(10) Patent No.: US 9,591,436 B2
(45) Date of Patent: Mar. 7, 2017

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Shukei Kurihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/049,853

(22) Filed: Feb. 22, 2016

(65) Prior Publication Data
US 2016/0261975 A1 Sep. 8, 2016

(30) Foreign Application Priority Data
Mar. 4, 2015 (JP) ................. 2015-042978

(51) Int. Cl.
| | |
|---|---|
| *H04B 5/00* | (2006.01) |
| *H04M 1/00* | (2006.01) |
| *H04W 4/00* | (2009.01) |
| *H04W 12/06* | (2009.01) |
| *H04W 76/02* | (2009.01) |
| *H04W 84/12* | (2009.01) |

(Continued)

(52) U.S. Cl.
CPC .......... *H04W 4/008* (2013.01); *H04B 5/0031* (2013.01); *H04W 12/06* (2013.01); *H04W 76/023* (2013.01); *H04W 84/12* (2013.01); *H04W 88/02* (2013.01); *H04W 88/08* (2013.01)

(58) Field of Classification Search
CPC .... H04B 1/38; H04B 5/0062; H04B 7/15507; H04W 4/008; H04W 48/18; H04W 76/02; H04W 84/12; H04W 88/08; H04M 1/00; H04M 1/72527; H04M 1/7253; H04M 2250/06
USPC ............... 455/41.1, 41.2, 41.3, 552.1, 553.1; 370/328, 338
See application file for complete search history.

(56) References Cited

U.S. PATENT DOCUMENTS

| | | | | |
|---|---|---|---|---|
| 8,605,600 | B2* | 12/2013 | Takeda .................. | H04W 24/04 370/242 |
| 8,805,279 | B2* | 8/2014 | Choi ..................... | H04W 4/008 455/41.1 |

(Continued)

FOREIGN PATENT DOCUMENTS

JP 2014-197262 10/2014

*Primary Examiner* — Quochien B Vuong
(74) *Attorney, Agent, or Firm* — Fitzpatrick, Cella, Harper & Scinto

(57) ABSTRACT

A communication apparatus of the present invention and the method of controlling the same associate and store device identification information that identifies a device and access point identification information that identifies an access point, and upon obtaining, from a device, communication information for communicating with the device, specify access point information corresponding to device identification information included in the communication information obtained from the stored access point identification information. Then, the access point indicated by the specified access point information is connected to, and communication is executed between a device indicated by the device identification information included in the communication information and the communication apparatus.

19 Claims, 11 Drawing Sheets

(51) Int. Cl.
*H04W 88/02* (2009.01)
*H04W 88/08* (2009.01)

(56) References Cited

U.S. PATENT DOCUMENTS

| | | | |
|---|---|---|---|
| 9,083,837 B2* | 7/2015 | Tredoux | H04B 5/0031 |
| 2014/0027506 A1* | 1/2014 | Heo | G06K 19/0725 |
| | | | 235/380 |
| 2014/0286242 A1* | 9/2014 | McCann | H04W 76/021 |
| | | | 370/328 |
| 2015/0312794 A1* | 10/2015 | Matsuda | G06F 3/1203 |
| | | | 370/230 |

* cited by examiner

FIG. 7A

| NFC Tag INFORMATION | VALUE | |
|---|---|---|
| 1. STARTUP APPLICATION INFORMATION | com.example.printapp | ~701 |
| 2. WIRELESS LAN CONNECTION INFORMATION | SSID:AP-NRT-01<br>Password:ADC1AD099.. | ~702 |
| 3. DEVICE INFORMATION | MAC: 1c-3e-fc-4e-45-db | ~703 |
| 4. DEVICE NAME INFORMATION | Printer01 | ~704 |

FIG. 7B

| NFC Tag INFORMATION | VALUE | |
|---|---|---|
| 1. STARTUP APPLICATION INFORMATION | com.example.printapp | ~701 |
| 2. WIRELESS LAN CONNECTION INFORMATION | | ~702 |
| 3. DEVICE INFORMATION | MAC: 1c-3e-fc-4e-45-db | ~703 |
| 4. DEVICE NAME INFORMATION | Printer01 | ~704 |

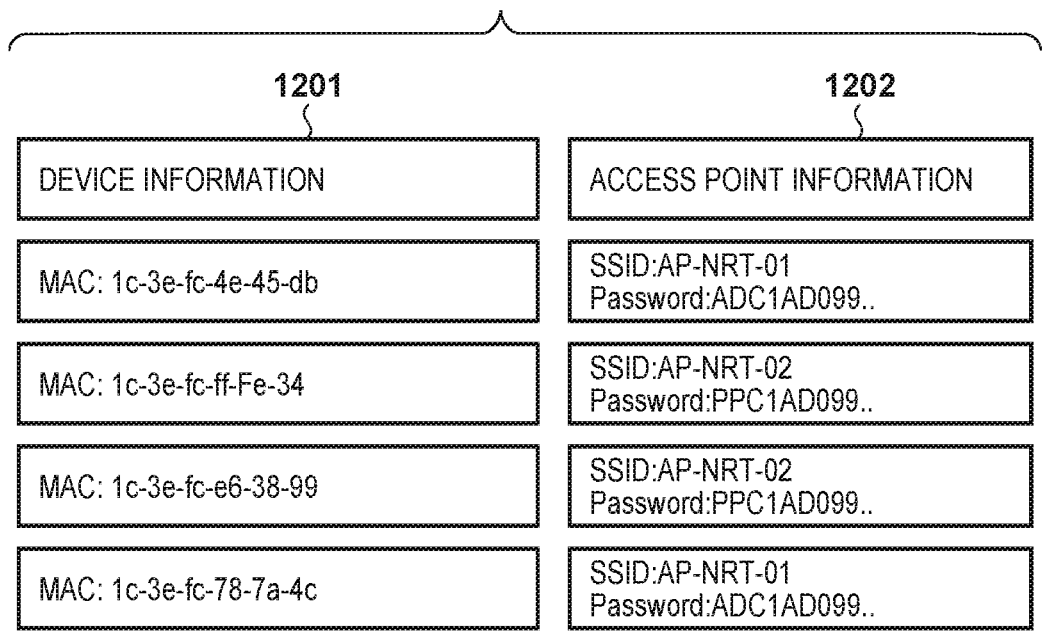

COMMUNICATION APPARATUS, METHOD OF CONTROLLING THE SAME, AND STORAGE MEDIUM

BACKGROUND OF THE INVENTION

Field of the Invention

The present invention relates to a communication apparatus, a method of controlling the same, and a storage medium.

Description of the Related Art

Equipping a multi-function peripheral (MFP) or the like with NFC (Near Field Communication) is becoming universalized. In an NFC tag, information specifying an apparatus in which the NFC tag is equipped, such as connection information (an IP address or a MAC address) of the apparatus is recorded.

Meanwhile, in a mobile terminal that can read content of an NFC tag by touching the NFC tag, an application that prints an image, a document or the like may be implemented. A handover that uses NFC information in which, with such a mobile terminal, in a state in which the application is activated and an image is displayed on a display unit of the mobile terminal, for example by touching an NFC tag equipped in an MFP, the image data of the image is read by the MFP is known. It is possible for the mobile terminal to connect to the MFP via the wireless LAN in accordance with the NFC information, designate the MFP of the handover destination to be a print destination, and then the MFP to print.

For example Japanese Patent Laid-Open No. 2014-197262 discloses a technique in which, when switching to wireless communication via an access point, to decide which access point to connect to, a history of access points previously connected to is referred to, and access points are connected to in an order of the history.

As in the above described prior art, when connecting to access points in sequence in accordance with a history of previously connected access points history, there is a problem in that a long time is required for the connection because the history includes an access point which cannot connect to the MFP to which connection is desired.

SUMMARY OF THE INVENTION

An aspect of the present invention is to eliminate the above-mentioned problems with the conventional techniques.

A feature of the present invention is providing a technique that can swiftly connect to an access point with which a communication apparatus and a device can communicate.

According to a first aspect of the present invention, there is provided a communication apparatus, comprising: a storage unit configured to store device identification information identifying a device in association with access point identification information identifying an access point; an obtaining unit configured to obtain, from a device, communication information for communicating with the device; a specifying unit configured to specify, from access point identification information stored in the storage unit, access point information corresponding to device identification information included in the communication information; and a wireless communication unit configured to connect to an access point indicated by the access point information specified by the specifying unit, and execute communication between a device indicated by the device identification information included in the communication information and the communication apparatus.

According to a second aspect of the present invention, there is provided a method of controlling a communication apparatus having a storage unit that stores device identification information identifying a device in association with access point identification information identifying an access point, the method comprising: obtaining, from a device, communication information for communicating with the device; specifying, from access point identification information stored in the storage unit, access point information corresponding to device identification information included in the communication information; and connecting to an access point indicated by the specified access point information, and executing communication between a device indicated by the device identification information included in the communication information and the communication apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7A and FIG. 7B respectively depict views for describing examples of information written in the NFC tag according to the first embodiment.

FIG. 12 depicts a view for describing an example of combined information of MFPs and access points that is stored for an MFP application according to the first embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1A:
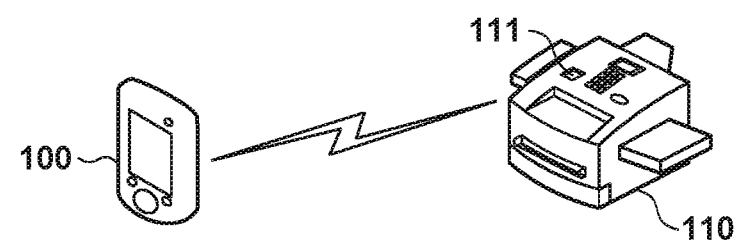
FIG. 1A and FIG. 1B respectively depict views for explaining an example configuration of a communication system according to a first embodiment of the present invention.

FIG. 1A depicts a view for explaining an example of a configuration (software AP mode) of a communication system according to a first embodiment of the present invention.

The communication system according to the first embodiment has a mobile terminal 100, a multi-function peripheral 110, and an NFC tag 111 (near field wireless communication tag) mounted in the MFP 110. The MFP 110 operates as a software access point, and executes wireless communication, such as that of a wireless communication LAN, with the mobile terminal 100.

The mobile terminal 100 can execute wireless communication via a wireless LAN or the like. By a user inputting an SSID and a security key of the MFP 110 into the mobile terminal 100, the mobile terminal 100 connects to the MFP 110, and the mobile terminal 100 can communicate with the MFP 110 via the wireless LAN.

Figure 1B:
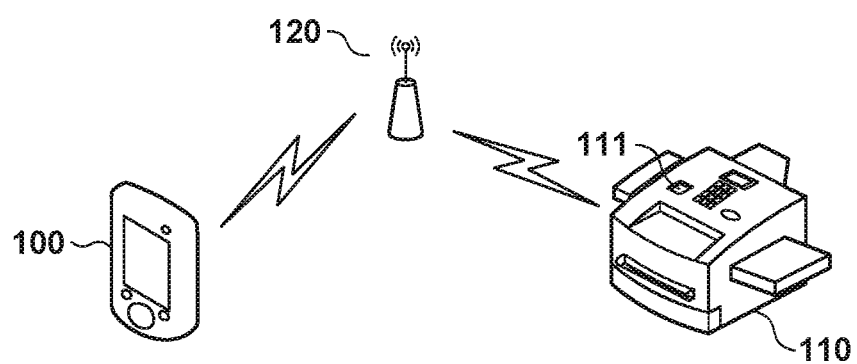

FIG. 1B depicts a view for explaining an example of a configuration (an infrastructure mode) of another communication system according to the first embodiment.

The communication system illustrated in FIG. 1B has the mobile terminal 100, the MFP 110, the NFC tag 111 mounted in the MFP 110, and an access point 120.

The MFP 110 executes wireless communication, via the wireless LAN or the like, with the access point 120. Note that communication between the access point 120 and the MFP 110 may be wired communication that uses a LAN cable or the like. By a user inputting an SSID and a security key of the access point 120 into the mobile terminal 100, the mobile terminal 100 connects to the access point 120, and can communicate with the MFP 110 via the access point 120.

The mobile terminal 100 illustrated in FIG. 1A and FIG. 1B can transmit a print job to the MFP 110 via the wireless LAN. The MFP 110 receives the print job from the mobile terminal 100, and executes printing thereof.

In addition, the mobile terminal 100 and the MFP 110 can execute near field wireless communication such as NFC. In the case of the first embodiment, the MFP 110 is equipped with the NFC tag 111, and the NFC tag 111 stores tag information (the SSID and the security key of the access point 120) for connecting to the access point 120. The mobile terminal 100 can use NFC to obtain the tag information of the NFC tag 111 of the MFP 110, and connect to the access point 120 based on the obtained tag information. Using the information obtained by near field wireless communication such as NFC, and switching the communication of the mobile terminal 100 to wireless communication such as the wireless LAN in this way is referred to as a handover. By this handover, effort of a user of the mobile terminal 100 in inputting the information (the SSID and the security key of the access point 120) to connect to the access point 120 into the mobile terminal 100 is eliminated.

However, if the MFP 110 and the access point 120 are connected by wire, because the MFP 110 cannot obtain the information of the access point 120, it is not possible to write the information of the access point 120 into the NFC tag 111. Even with the infrastructure mode of FIG. 1B, because it is not certain whether or not the access point that the MFP 110 and the mobile terminal 100 connect to is the same, it is also not possible to write the information of the access point to the NFC tag 111 in this case. Therefore, after switching, in the mobile terminal 100, to communication by wireless LAN, a user must manually select an access point.

In the first embodiment, when the mobile terminal 100 and the MFP 110 are connected via an access point, the mobile terminal 100 stores information of the access point 120 of when it connected to the MFP 110. When, at a time that the mobile terminal 100 touches the NFC tag 111 of the MFP 110, the information of the access point for when the touched MFP 110 is connected to is stored, the access point is specified based on the stored information after communication by wireless LAN is switched to. With this, a user of the mobile terminal 100 can automatically specify the access point 120 to which the selected MFP 110 is connected.

Figure 2:
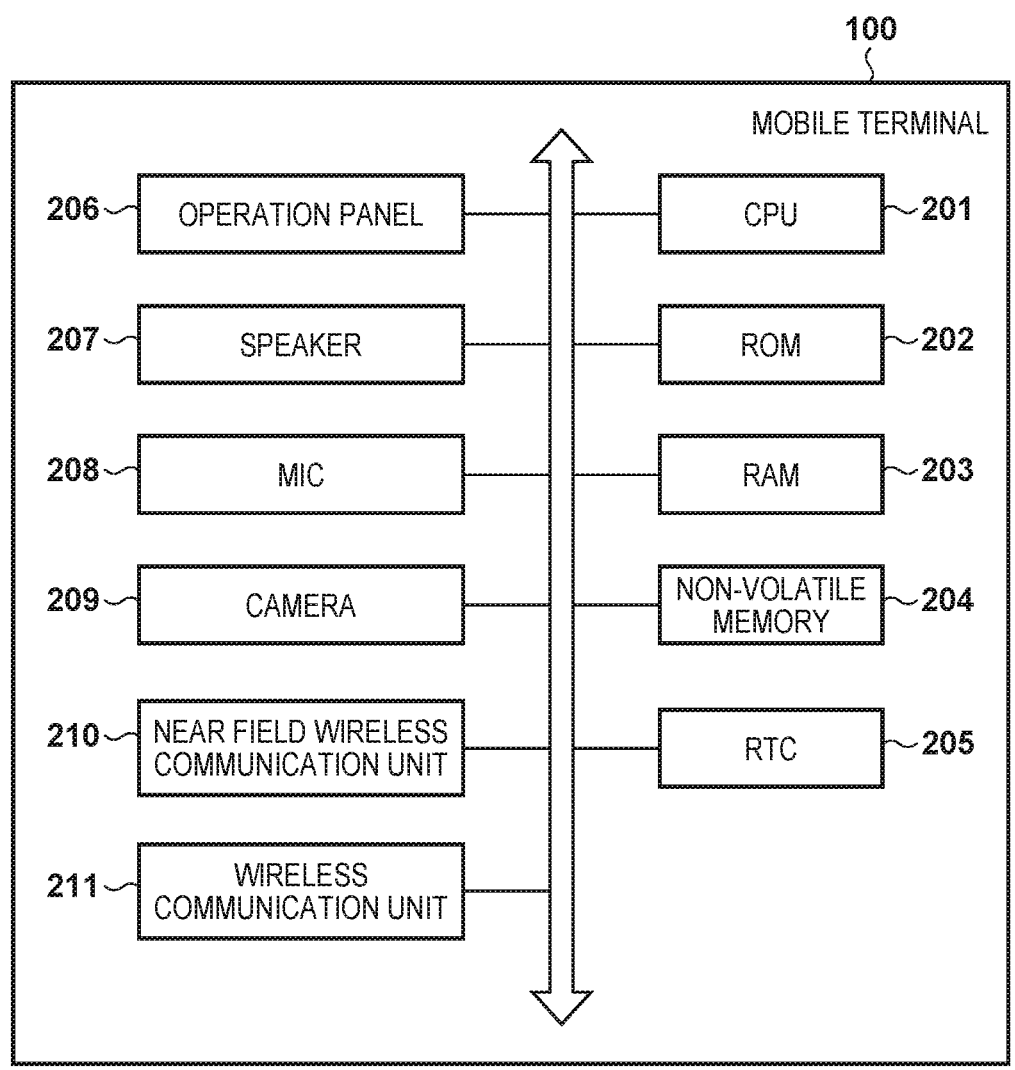
FIG. 2 is a block diagram for explaining a hardware configuration of a mobile terminal according to the first embodiment.

FIG. 2 is a block diagram for explaining a hardware configuration of the mobile terminal 100 according to the first embodiment. Note that, the mobile terminal 100 according to the first embodiment considers an apparatus, such as a smart phone or a tablet PC, for example, but limitation is not made to such a mobile terminal, and an information processing apparatus that can execute wireless communication may be used.

A CPU 201 deploys control programs stored by a ROM 202 or a non-volatile memory 204 into a RAM 203, and controls operation of the mobile terminal 100 by executing the programs. The ROM 202 stores control programs executed by the CPU 201. The RAM 203 is used as a temporary storage area such as a main memory, a work area, or the like, of the CPU 201. The non-volatile memory 204 is a memory card or the like that stores various data, such as a photograph or an electronic document. An RTC (Real Time Clock) 205 measures time.

Note that, in the case of the mobile terminal 100 according to the first embodiment, although one CPU 201 executes each process illustrated in a flowchart described later, another configuration may be taken. For example, it is possible for a plurality of CPUs to cooperate so as to execute each process illustrated in the flowchart described later.

An operation panel 206 is equipped with a touch panel function that is able to detect a touch operation of a user, and displays various screens. By inputting a touch operation to the operation panel 206, the user can input a desired operation instruction to the mobile terminal 100. Note that the mobile terminal 100 is equipped with hardware keys (not shown), and a user can use these hardware keys to input an operation instruction to the mobile terminal 100. A speaker 207 and a microphone 208 are used when a user performs a telephone call with another mobile terminal or a fixed telephone. A camera 209 captures in accordance with a capturing instruction of a user. A photographic image captured by the camera 209 is stored in the non-volatile memory 204. In addition, the non-volatile memory 204 stores programs such as an OS 311 or an MFP application 300 illustrated in FIG. 3.

A near field wireless communication unit 210 executes near field wireless communication such as NFC. In the first embodiment, the MFP 110 is equipped with the NFC tag 111, and by a user causing the mobile terminal 100 to approach the NFC tag 111 of the MFP 110, near field wireless communication is established between the near field wireless communication unit 210 and the NFC tag 111 of the MFP 110. The near field wireless communication unit 210 then obtains information of the NFC tag 111. Note that the near field wireless communication that the near field wireless communication unit 210 executes is not limited to NFC, and may be Bluetooth, for example.

A wireless communication unit 211 executes wireless communication such as that of wireless LAN. In the case of the mobile terminal 100, by using a handover, it is possible to realize wireless communication by the wireless communication unit 211 by an operation that is simple for a user. Specifically, by using the connection information (the SSID and the security key of the access point 120) that the near field wireless communication unit 210 obtained from the NFC tag 111 of the MFP 110, the wireless communication unit 211 can connect to the access point 120.

Figure 3:
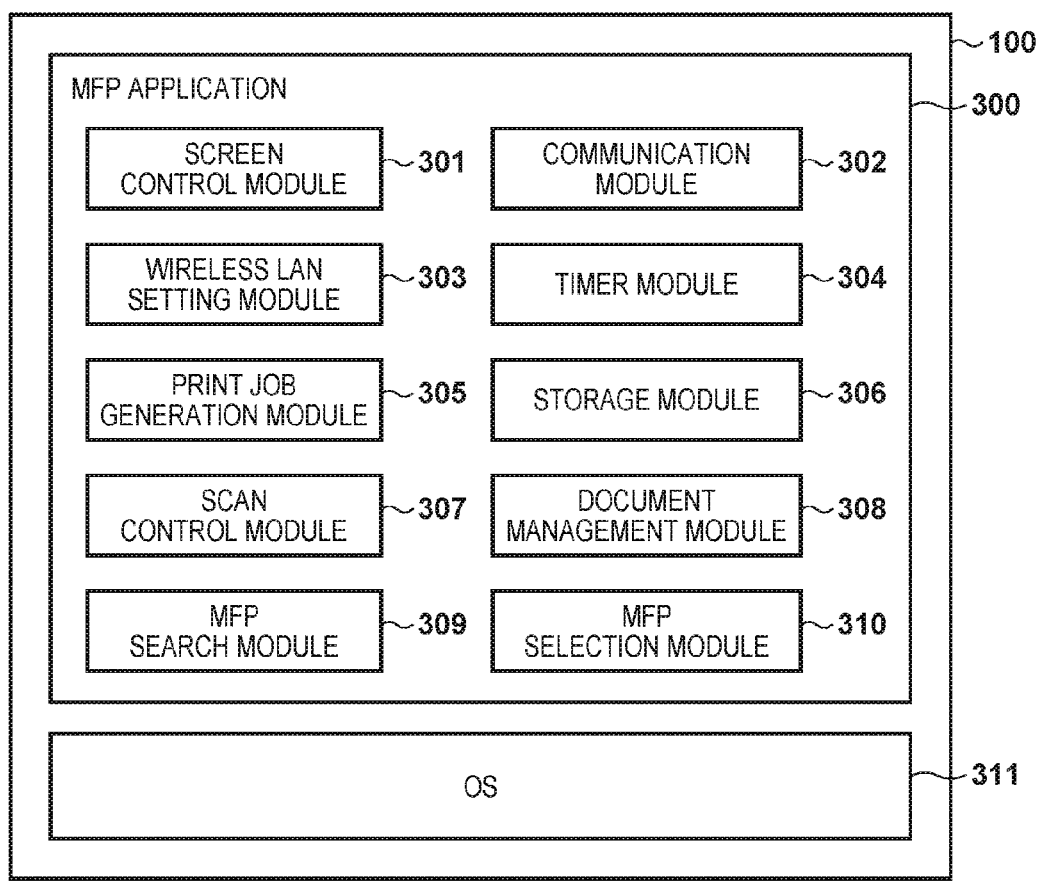
FIG. 3 is a functional block diagram for explaining a software configuration of the mobile terminal according to the first embodiment.

FIG. 3 is a functional block diagram for explaining a software configuration of the mobile terminal 100 according to the first embodiment. FIG. 3 is a functional block diagram of software realized by the CPU 201 deploying a control program stored in the ROM 202 or the non-volatile memory 204 into the RAM 203 and executing it.

The OS 311 is software for controlling operation of the mobile terminal 100 on the whole. Various applications, including the MFP application 300 which is described later, can be installed in the mobile terminal 100. The OS 311 exchanges information with these applications, and, in accordance with an instruction received from an application, changes screens displayed on the operation panel 206, and executes wireless communication in accordance with the wireless communication unit 211.

The MFP application 300 is an application installed in the mobile terminal 100. It is possible to make an instruction, such as for printing or scanning, from the MFP application 300 to the MFP 110. Various applications other than the MFP application 300 are installed in the mobile terminal 100, but their explanation is omitted.

Next, the software configuration of the MFP application 300 is further explained in detail.

A screen control module 301 controls display to the operation panel 206 via the OS 311. Screens for various operations are displayed on the operation panel 206 by the screen control module 301. In addition, the screen control module 301 discriminates an instruction that a user inputs via the operation panel 206. A communication module 302 controls, via the OS 311, near field wireless communication in accordance with the near field wireless communication unit 210, or wireless communication in accordance with the wireless communication unit 211. A wireless LAN setting module 303 changes, via the OS 311, a setting of the wireless LAN regarding wireless communication of the mobile terminal 100. A timer module 304 controls a time count that the RTC 205 uses. A print job generation module 305 generates a print job. A print job generated by the print job generation module 305 is transmitted to the MFP 110 by the wireless communication unit 211, and printing is executed by the MFP 110. A storage module 306 temporarily stores various information in the non-volatile memory 204. A scan control module 307 performs a scan instruction to the MFP 110 in accordance with the wireless communication unit 211, and displays scan data received from the MFP 110. In a case of storing scan data, the scan data is stored to the storage module 306. The stored scan data is managed by a document management module 308.

An MFP search module 309, via the wireless communication unit 211, transmits a search command on the network, and, from received response data, lists corresponding MFPs. From the retrieved MFP list, an MFP selection module 310 selects a target MFP, and stores it in the storage module 306. The MFP selection module 310 stores a list of MFPs selected in the past.

Figure 4:
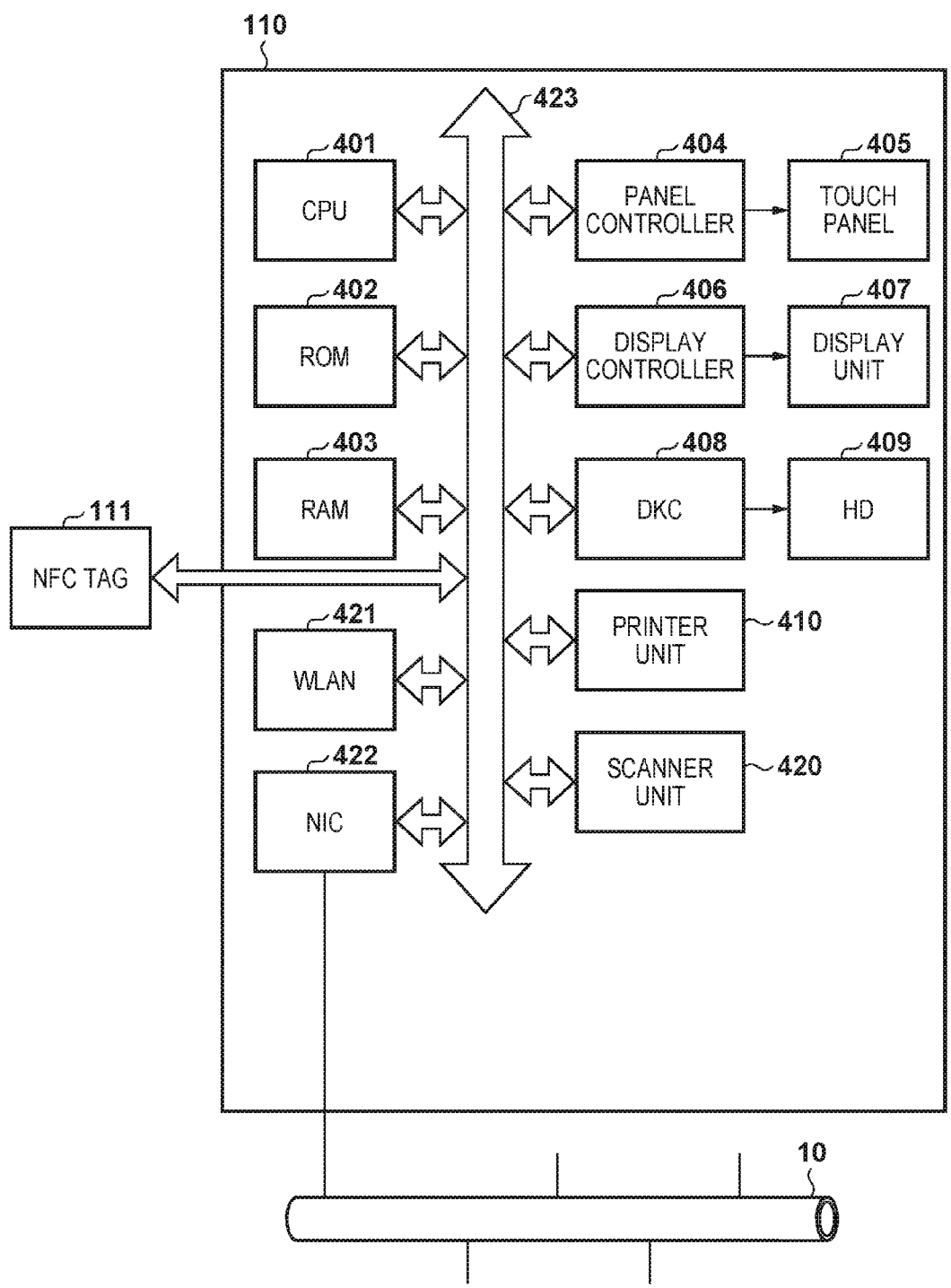
FIG. 4 is a block diagram for describing an example of a hardware configuration of a multi-function peripheral (MFP) according to the first embodiment.

FIG. 4 is a block diagram for describing an example of a hardware configuration of a multi-function peripheral (MFP) according to the first embodiment.

The multi-function peripheral 110 is equipped with a CPU 401 that executes software stored in a ROM 402 or for example a large-scale storage unit such as a hard disk 409, and the CPU 401 comprehensively controls each unit connected to a system bus 423. A RAM 403 functions as a main memory, a work area, or the like, of the CPU 401. A panel controller 404 controls an input of an instruction from a touch panel 405 or various buttons arranged on the multi-function peripheral 110. A display controller 406 controls display to a display unit 407, which for example includes a liquid crystal display unit or the like. A disk controller (DKC) 408 controls the large-scale storage unit (HD) 409. A network interface card (NIC) 422 exchanges data bidirectionally with another network device, a file server, or the like, via a network 10. In a case of operating in the infrastructure mode of FIG. 1B, a wireless communication module (WLAN) 421 connects to the network 10 via the access point 120, and bidirectionally exchanges data with another network device or the like. If operating in the software AP mode of FIG. 1A, the MFP 110 operates as an access point, and can perform direct wireless communication with the mobile terminal 100. A printer unit 410 prints an image on print paper, for example in accordance with an electrophotographic method, an ink-jet method, or the like. A scanner unit 420 reads an image of an original, and outputs the image as image data. In many cases an ADF (automatic document feeder) (not shown) is mounted as an option to the scanner unit 420, and can automatically convey and read a plurality of originals. Note that the HD 409 may be used as a temporary storage location of image data. The NFC tag 111 records information of an application that is activated, a wireless LAN handover, or the like. The mobile terminal 100 uses an NFC reader/writer to read this information of the NFC tag 111.

Figure 5:
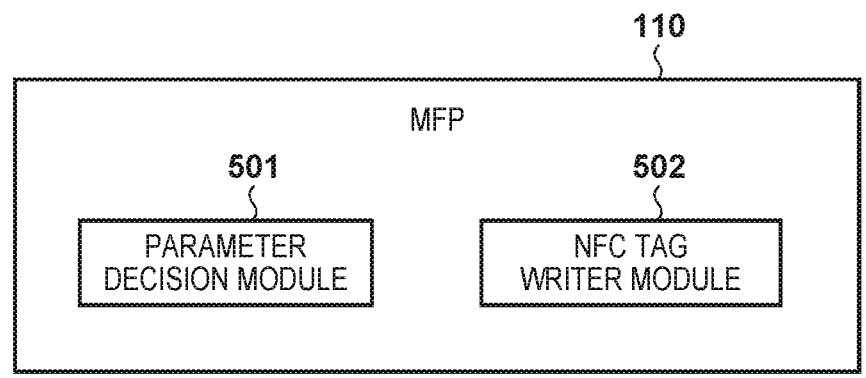
FIG. 5 is a functional block diagram for describing a software configuration of the multi-function peripheral according to the first embodiment.

FIG. 5 is a functional block diagram for describing a software configuration of the multi-function peripheral 110 according to the first embodiment. Software that realizes these functions is stored in the ROM 402 or the HD 409, and at a time of execution is deployed into the RAM 403 and executed under the control of the CPU 401.

A parameter decision module 501 sets information to write to the NFC tag 111. Specifically, connection information of the wireless LAN and device name information are decided as parameters. The wireless LAN connection information is decided from the connection state of the MFP 110. In the case of a software AP mode, an SSID and a password are set, and in the case of an infrastructure mode or a wired connection, a blank is set. An NFC tag writer module 502 writes the parameters decided by the parameter decision module 501 to the NFC tag 111.

Figure 6:
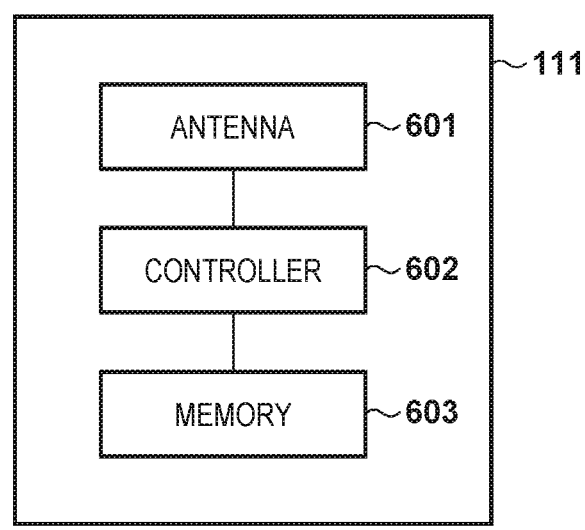
FIG. 6 is a block diagram for explaining a hardware configuration of an NFC tag according to the first embodiment.

FIG. 6 is a block diagram for explaining a hardware configuration of the NFC tag 111 according to the first embodiment.

An antenna 601 is connected to a controller 602. The antenna 601 is supplied with power by an electromagnetic induction from the near field wireless communication unit 210 of the mobile terminal 100, which is made to be the operating power of the controller 602. In addition, the antenna 601 operates as an antenna for wireless communication from the near field wireless communication unit 210. The controller 602 performs communication with the mobile terminal 100 via the antenna 601. In addition, in accordance with read/write instructions by the communication, it performs read/write processes with respect to a memory 603. Accordingly, the memory 603 holds information of the MFP 110 such as a MAC address to be described later, and the controller 602 is able to transmit this information via the antenna 601 as necessary.

FIGS. 7A and 7B respectively depict views for illustrating examples of information written in the NFC tag 111 according to the first embodiment. FIG. 7A illustrates information of a case of the software AP mode of FIG. 1A, and FIG. 7B illustrates information of a case of the infrastructure mode of FIG. 1B.

In FIG. 7A, startup application information 701 describes a name of an application that activates when the mobile terminal 100 touches the NFC tag 111. In the examples of FIGS. 7A and 7B, activating the MFP application 300 "com.example.printapp" is illustrated. Wireless LAN connection information 702 includes password information and an SSID of the access point 120, which can connect to the MFP 110. Device information 703 illustrates a record of a MAC address, which is network connection information, and here the MAC address of the MFP 110 is illustrated. In the first embodiment, only the MAC address is described, but it may also be a combination of information that can distinguish the MFP 110, such as an IP address or a UUID. Device name information 704 stores "Printer01", which is the name of the MFP 110.

FIG. 7B illustrates content written in a case of the infrastructure mode, and in this case because communication is performed with the MFP 110 via the access point, the wireless LAN connection information 702 is blank.

Figure 8:
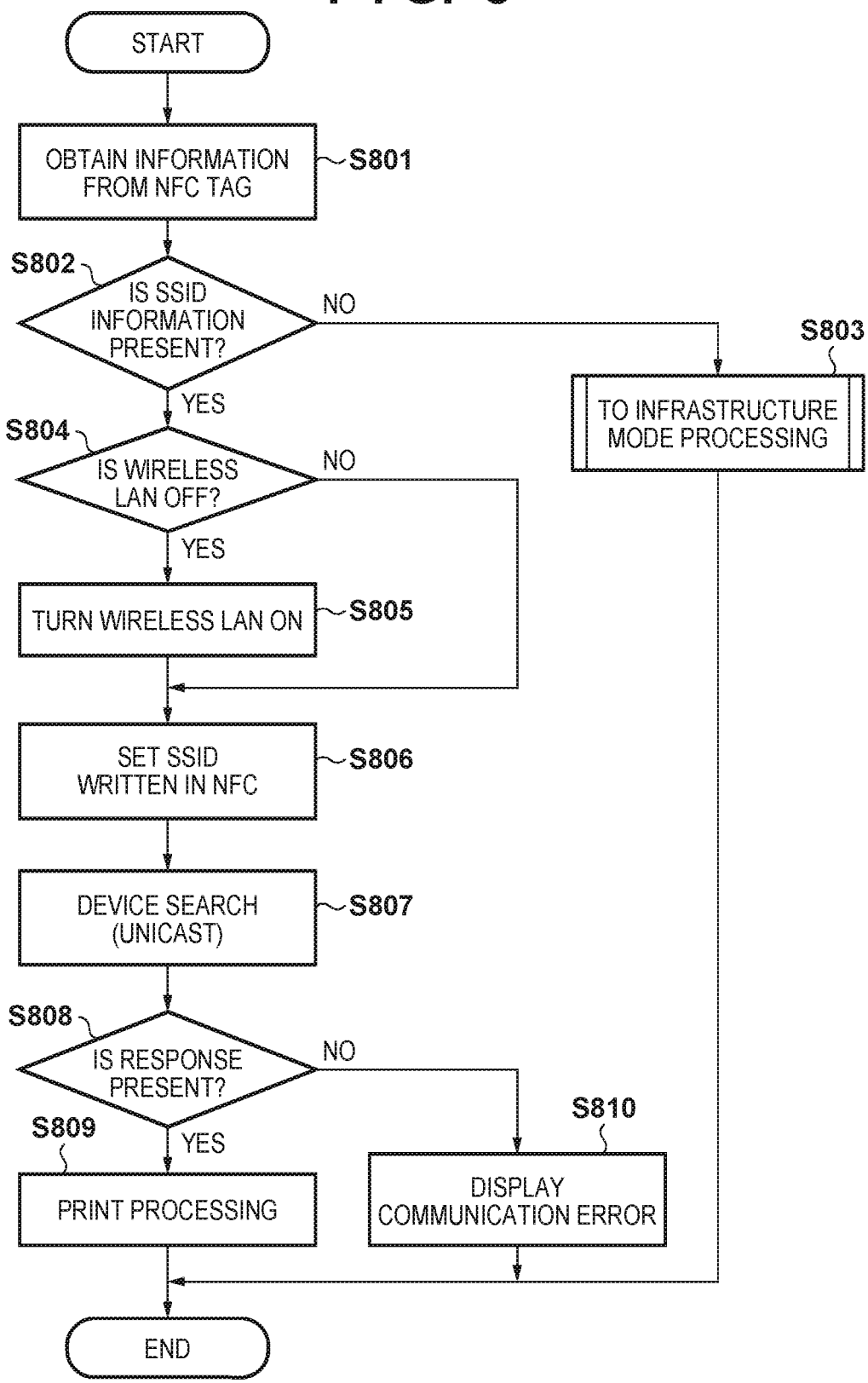
FIG. 8 is a flowchart for describing processing executed by the mobile terminal when the mobile terminal according to the first embodiment touches the NFC tag of the MFP.

FIG. 8 is a flowchart for describing processing executed by the mobile terminal 100 when the mobile terminal 100 according to the first embodiment touches the NFC tag 111 of the MFP 110. This processing illustrates processing in a case of the software AP mode. In the first embodiment, explanation is given of processing that executes printing after the MFP 110 is selected when the NFC tag 111 is touched and the wireless LAN is switched to. However, processing for after the NFC tag 111 is touched is not necessarily print processing, and processing according to a screen may be executed, or a manual operation by a user may be received. Note that each step illustrated in the flowchart of FIG. 8 is realized by the CPU 201 deploying a program stored in the ROM 202 or the non-volatile memory 204 into the RAM 203 and executing the program.

Firstly, a user of the mobile terminal 100 touches the mobile terminal 100 to the NFC tag 111 of the MFP 110 to be a communication partner. With this, in step S801, upon detecting that the mobile terminal 100 has touched the NFC tag 111 of the MFP 110, the CPU 201 obtains the tag information written in the NFC tag 111, and the processing proceeds to step S802. In step S802, the CPU 201 determines whether an SSID (reference numeral 702 of FIG. 7A) is included in the information obtained from the NFC tag 111. If the SSID is included, the CPU 201 determines that the MFP 110 is in the software AP mode, and the processing proceeds to step S804. However, if the SSID is not included, the infrastructure mode is determined and the processing proceeds to step S803. Processing of a time of the infrastructure mode of step S803 is later described with reference to the flowchart of FIG. 9.

In step S804 the CPU 201 determines whether or not a wireless LAN setting of the mobile terminal 100 is off. If it is determined that the wireless LAN setting is on, the processing proceeds to step S806, and if it is determined to be off, the processing proceeds to step S805, the setting of the wireless LAN is turned on and the processing proceeds to step S806. In step S806, the CPU 201 sets the SSID obtained from the NFC tag 111 to the SSID of the wireless LAN, and the processing proceeds to step S807. In step S807, based on the device information 703 obtained from the NFC tag 111, the CPU 201 searches for the MAC address of the MFP 110 by a unicast. The processing proceeds to step S808, and the CPU 201 determines whether or not there is a response from the MFP 110 corresponding to the MAC address. If there is a response, the processing proceeds to step S809, and if not, the processing proceeds to step S810. In step S809, the CPU 201 issues a print instruction to the MFP 110 to execute print processing, and this processing terminates. Meanwhile, in step S810, the CPU 201 displays a communication error, and this processing terminates.

The foregoing processing is processing that is executed in the software AP mode.

Figure 9:
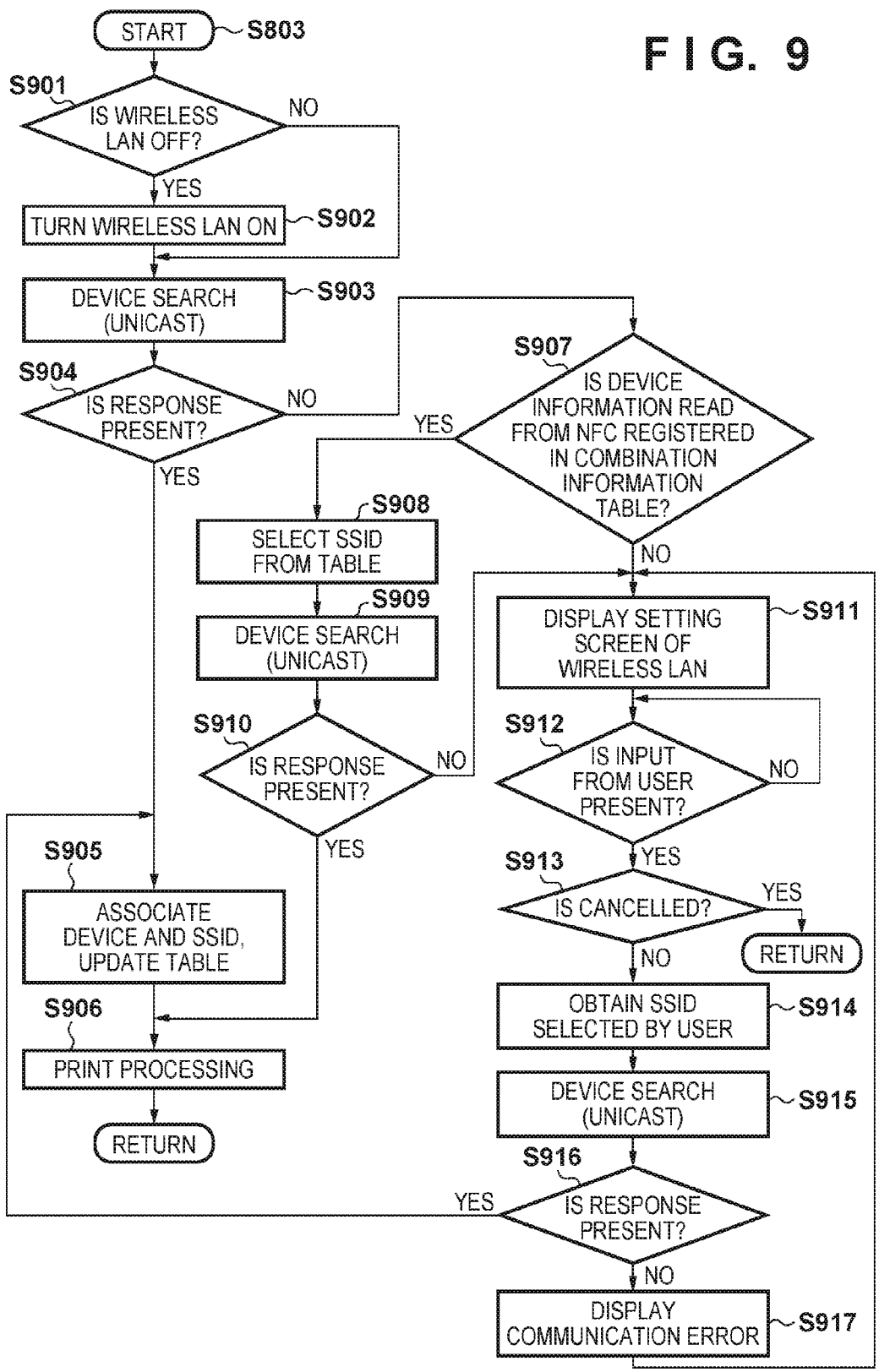
FIG. 9 is a flowchart for describing processing of step S803 of FIG. 8 performed by the mobile terminal according to the first embodiment when the MFP is in an infrastructure mode.

FIG. 9 is a flowchart for describing processing of step S803 of FIG. 8 performed by the mobile terminal 100 according to the first embodiment when the MFP 110 is in an infrastructure mode.

The MFP application 300 holds a combination information table of the MFP 110 and the access point 120, for example as in FIG. 12.

FIG. 12 depicts a view for describing an example of combined information that associates MFPs and access points and that is stored for the MFP application 300 according to the first embodiment.

Device information 1201 illustrates a MAC address of the MFP 110 (identification information). Access point information 1202 illustrates information of the access point 120 when it is connected to the MFP 110, and includes an SSID (an identifier of the access point) and password information (security information) of the access point 120.

In step S901, similarly to step S804 of FIG. 8, the CPU 201 determines whether or not the setting of the wireless LAN of the mobile terminal 100 is off. If it is on, the processing proceeds to step S903, and if it is off, the processing proceeds to step S902, the CPU 201 turns on the wireless LAN setting, and the processing proceeds to step S903. At this point an access point is not explicitly selected in particular, but from access points that can be connected to at that point in time for which there is connection history, an access point that has been recently connected is selected. In step S903, based on the device information 703 obtained from the NFC tag 111, the CPU 201 performs a search for the MAC address of the MFP 110 by a unicast. Then, the processing proceeds to step S904 and the CPU 201 determines whether or not there is a response from the MFP 110. If there is a response, the processing proceeds to step S905, and if there is no response, the processing proceeds to step S907. In step S905, the CPU 201 updates the combination information table of the access point 120 and the MFP 110, the processing proceeds to step S906, and similar to step S809 of FIG. 8, the CPU 201 issues a print instruction to the MFP 110 to execute print processing, and this processing terminates.

When there is a response from the MFP 110 and communication with the MFP 110 has succeeded is a case in which communication is successful via the access point recently connected from access points that can be connected to currently. In a home, an office, or the like, this corresponds to a case such as where connection via an access point that is often used succeeds.

In step S907 the CPU 201 determines whether or not the MAC address of the MFP 110 read from the NFC tag 111 is, for example, present in the combination information table illustrated in FIG. 12. If it is present, the processing proceeds to step S908. If it is not present, the processing proceeds to step S911. In step S908, the CPU 201 selects an SSID of an access point associated with the MAC address of the MFP 110. The processing proceeds to step S909, and, via that access point, the CPU 201 uses the MAC address of the MFP 110 to perform a search for a device by unicast. In step S910, the CPU 201 determines whether or not there is a response from the MFP 110. If there is a response, the processing proceeds to step S906, and if there is no response from the MFP 110, the processing proceeds to step S911. In step S906 the CPU executes print processing, and this processing terminates.

In step S911, the CPU 201 displays a setting screen of the wireless LAN on the operation panel 206, and the processing proceeds to step S912. In step S912, the CPU 201 determines whether or not input from a user is present. If it is present, the processing proceeds to step S913, and if it is not, step S912 is executed. In step S913, the CPU 201 determines whether or not the input by the user is a cancel instruction. If it is the cancel instruction, this processing terminates. In contrast, when it is not the cancel instruction, the processing proceeds to step S914. In step S914, the CPU 201 selects an access point based on the SSID input by the user, and the processing proceeds to step S915. In step S915, via that access point, the CPU 201 uses the MAC address of the MFP 110 to perform a search for a device by unicast. In step S916, the CPU 201 determines whether or not there is a response from the MFP 110. If there is a response from the MFP 110, the processing proceeds to step S905, and if there is no response, the processing proceeds to step S917. In step S917, the CPU 201 displays a communication error message on the operation panel 206, and the processing returns to step S911.

By the first embodiment, as explained above, when the mobile terminal 100 has approached the NFC tag 111 of the MFP 110, an access point that is stored in association with that MFP 110 and was used in communication in the past can be automatically selected.

Accordingly, it is possible for a user to easily connect to an MFP via an access point, transmit print data, and cause the execution of an operation, such as causing printing to be performed, without performing cumbersome work such as setting an SSID or selecting an access point.

Second Embodiment

In the previously described first embodiment, in the case in which the MFP 110 is in the infrastructure mode, firstly, from access points that can be connected to at that point in time and for which there is a connection history, connection with the MFP 110 is attempted via an access point that was recently connected to. If it is not possible to connect, for example, a combination information table, such as is illustrated in FIG. 12, is referred to, and an access point is selected. However, the priority order of this may be in reverse. Accordingly, in the second embodiment, explanation is given of an example of first referring to the combination information table and selecting an access point. Note that because the system configuration and the configuration of the multi-function peripheral 110 and the mobile terminal 100 according to the second embodiment are the same as those of the previously described first embodiment, explanation thereof is omitted.

Figure 10:
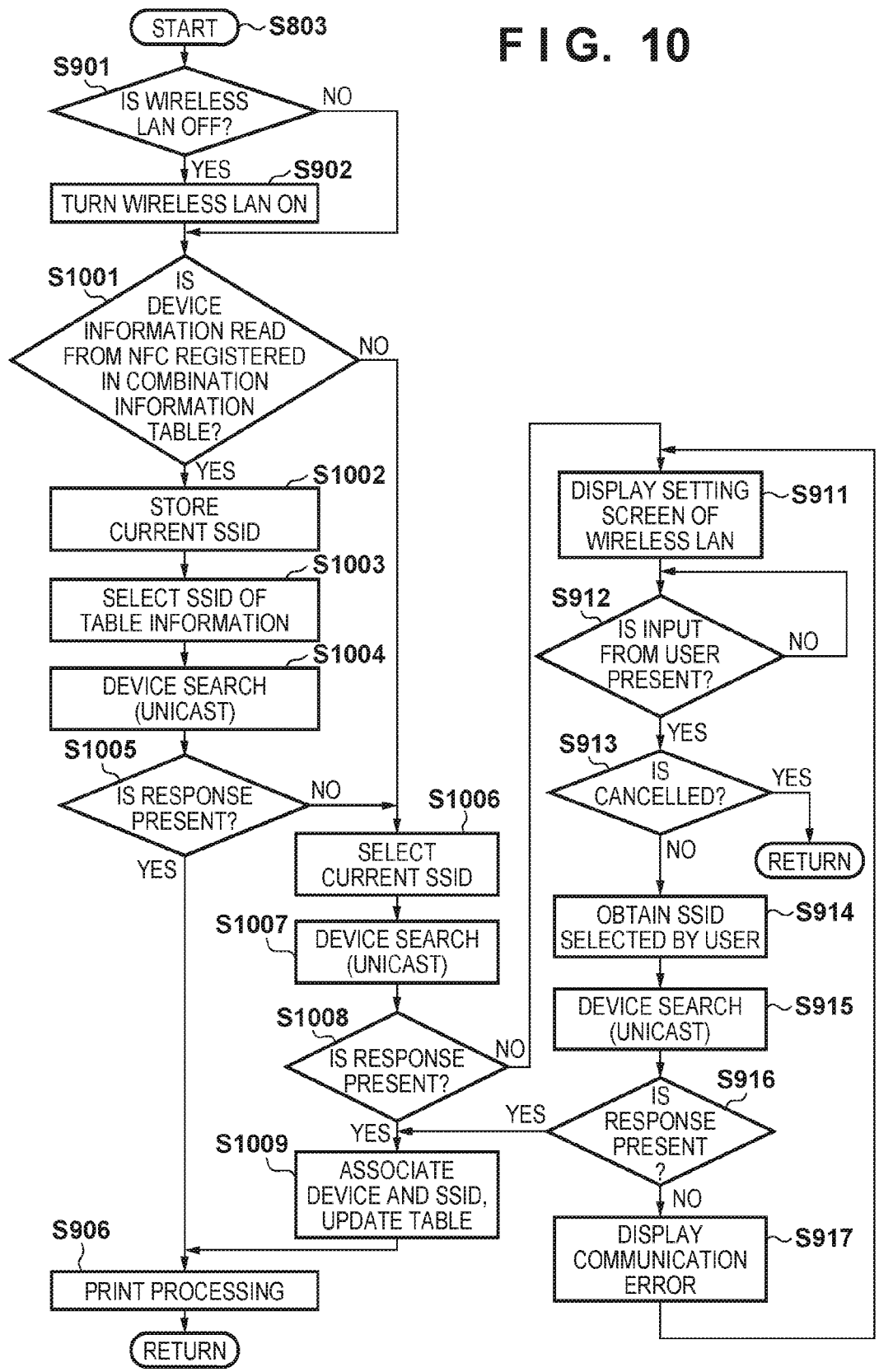
FIG. 10 is a flowchart for describing processing of step S803 of FIG. 8 performed by the mobile terminal according to a second embodiment of the present invention when the MFP is in an infrastructure mode.

FIG. 10 is a flowchart for describing processing of step S803 of FIG. 8 performed by the mobile terminal 100 according to the second embodiment of the present invention when the MFP 110 is in an infrastructure mode. Note that each step illustrated in the flowchart of FIG. 10 is realized by the CPU 201 deploying a program stored in the ROM 202 or the non-volatile memory 204 into the RAM 203 and executing the program. In the second embodiment, only differences from the previously described first embodiment are explained. In addition, in FIG. 10 steps that are the same as processing steps of FIG. 9 are given the same reference numerals, and explanation thereof is omitted.

In step S1001 the CPU 201, similarly to step S907 of FIG. 9, determines whether or not the MAC address of the MFP 110 read from the NFC tag 111 is present in the combination information table. If it is determined to be present, the processing proceeds to step S1002, if not, the processing proceeds to step S1006. In step S1002, when the setting of the wireless LAN is on, the CPU 201 has selected, from access points that are connectable at that point in time and have a connection history, an access point that was connected to recently. Accordingly, here, the SSID or the like of the access point that is connected to is stored in the RAM 203, and the processing proceeds to step S1003. In step S1003, the CPU 201 selects an access point linked to the MAC address of the combination information table obtained in step S1001, and the processing proceeds to step S1004. In step S1004, via that access point, the CPU 201 uses the MAC address of the MFP 110 to perform a search for a device by unicast. Then, in step S1005, the CPU 201 determines whether or not there is a response from the MFP 110. If there is a response, the processing proceeds to step S906 and printing is executed, and if there is no response, the processing proceeds to step S1006.

In step S1006, the CPU 201 selects the access point stored in step S1002 or the access point that was connected to at the time of step S1001, and the processing proceeds to step S1007. In step S1007, based on the device information 703 obtained from the NFC tag 111, the CPU 201 performs a search for the MAC address of the MFP 110 by a unicast. Then, in step S1008, the CPU 201 determines whether or not there is a response from the MFP 110. If there is a response from the MFP 110, the processing proceeds to step S1009, and if not, the processing proceeds to step S911. Because the processing of step S911-step S917 is the same as that in the flowchart of FIG. 9, explanation thereof is omitted.

In step S1009, the CPU 201 updates the combination information table of access points and MFPs, for example as illustrated in FIG. 12, and the processing proceeds to step S906. Note that it may be possible to set for each device (MFP here), whether to store a device/SSID combination.

By the second embodiment, as explained above, when the mobile terminal 100 has approached the NFC tag 111 of the MFP 110, an appropriate access point that can communicate with the MFP can be automatically selected. In addition, in the second embodiment, by selecting an access point by first referring to history information for past communication, because an access point having a proven connection is connected with priority, it is possible to shorten the time until a connection is made.

Accordingly, without performing a cumbersome operation such as selecting an access point, a user can easily make a wireless connection to an MFP in an infrastructure mode and cause execution of an operation such as printing.

Third Embodiment

In the previously described second embodiment, the combination information table of FIG. 12 is referenced, and an access point is selected, but if it is not possible to connect to an MFP via the selected access point, an access point that was last connected to is selected from connectable access points. However, configuration may be taken to attempt to connect to all connectable access points at that point in time.

Next, as a third embodiment of the present invention, explanation will be given for a case in which connection is attempted with respect to all connectable access points. Note that because the system configuration and the configuration of the multi-function peripheral 110 and the mobile terminal 100 according to the third embodiment are the same as those of the previously described first embodiment, explanation thereof is omitted.

Figure 11:
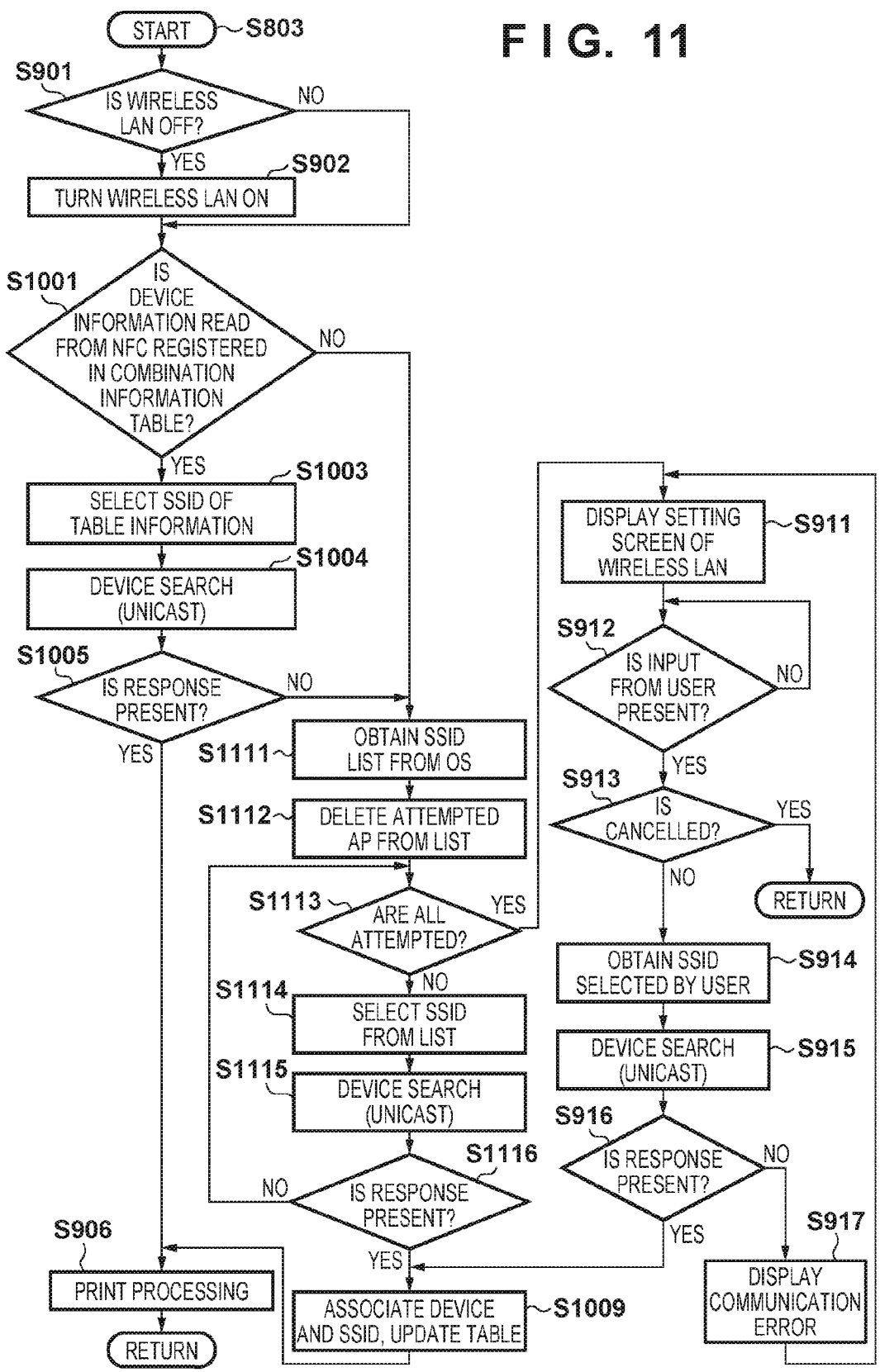
FIG. 11 is a flowchart for describing processing of step S803 of FIG. 8 performed by the mobile terminal according to a third embodiment of the present invention when the MFP is in the infrastructure mode.

FIG. 11 is a flowchart for describing processing of step S803 of FIG. 8 performed by the mobile terminal 100 according to the third embodiment of the present invention when the MFP 110 is in an infrastructure mode. Note that each step described in the flowchart of FIG. 11 is realized by the CPU 201 deploying a program stored in the ROM 202 or the non-volatile memory 204 into the RAM 203 and executing the program. In the third embodiment, only differences from the previously described second embodiment are explained. In addition, in FIG. 11, steps that are the same as processing steps of FIG. 9 and FIG. 10 are given the same reference numerals, and explanation thereof is omitted.

Processing of step S901, step S902, step S906, and step S1001 to step S1005 of FIG. 11, excluding the processing of step S1002, is the same as that of the second embodiment. In the third embodiment, because connection to all connectable access points is attempted, there is no need to store an access point that is connected at that time in step S1002.

In step S1111, the CPU 201 obtains a list of information of all connectable access points from the OS 311, and the processing proceeds to step S1112. In step S1112, if an access point that was attempted in step S1003 is present, the CPU 201 excludes it from the list and the processing proceeds to step S1113. In step S1113, the CPU 201 determines whether or not connection to all access points of the list has been attempted. If all access points have been attempted, the processing proceeds to step S911, otherwise the processing proceeds to step S1114.

In step S1114, the CPU 201 selects the next access point from the list of the access point information, and the processing proceeds to step S1115. In step S1115, via that access point, the CPU 201 uses the MAC address of the MFP 110 to perform a search for a device by unicast. Next, in step S1116, the CPU 201 determines whether or not there is a response from the MFP 110. If there is a response from the MFP 110, the processing proceeds to step S1009, and if not, the same the processing as that of step S1009 of FIG. 10 is executed, and the processing proceeds to step S906. In addition, in step S1116, if there is no response from the MFP 110, the processing returns to step S1113. Because the processing of step S911-step S917 is the same as that in the flowchart of FIG. 9, explanation thereof is omitted.

By virtue of the third embodiment, as explained above, when the mobile terminal 100 has approached the NFC tag 111 of the MFP 110, an appropriate access point that can communicate with the MFP can be automatically selected. In addition, because connection is attempted with respect to all connectable access points, the possibility of being able to connect increases.

Accordingly, a user can easily and smoothly perform an operation such as printing, without cumbersome processing such as selection of an access point.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Note, the present invention is not limited to the embodiment described above, and it is possible to make various modifications or changes without straying from the spirit and scope of the present invention. Accordingly, the following claims are attached to make public the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-042978, filed Mar. 4, 2015, which is hereby incorporated by reference herein in its entirety.

What is claimed is:
1. A communication apparatus, comprising:
   a storage unit configured to store device identification information identifying a device in association with access point identification information identifying an access point;
   an obtaining unit configured to obtain, from a device, communication information for communicating with the device;
   a specifying unit configured to specify, from access point identification information stored in the storage unit, access point information corresponding to device identification information included in the communication information; and
   a wireless communication unit configured to connect to an access point indicated by the access point information specified by the specifying unit, and execute commu- nication between a device indicated by the device identification information included in the communication information and the communication apparatus.

2. The communication apparatus according to claim 1, further comprising a determination unit configured to determine whether or not access point identification information is included in the communication information, wherein, if it is determined by the determination unit that the access point identification information is not included in the communication information, the wireless communication unit connects to the access point indicated by the access point information specified by the specifying unit, and if it is determined by the determination unit that the access point identification information is included in the communication information, the wireless communication unit connects to an access point indicated by the access point identification information included in the communication information.

3. The communication apparatus according to claim 1, wherein, if communication with a device succeeds, the storage unit associates and stores device identification information that identifies the device, and access point identification information that identifies an access point that is connected to when the communication succeeds.

4. The communication apparatus according to claim 1, wherein the obtaining unit obtains the communication information from an NFC tag that the device has.

5. The communication apparatus according to claim 1, wherein the communication apparatus is able to execute near field wireless communication, and the obtaining unit uses the near field wireless communication to obtain the communication information from the device.

6. The communication apparatus according to claim 5, wherein the near field wireless communication is NFC.

7. The communication apparatus according to claim 1, wherein the wireless communication unit transmits print data to the device indicated by the device identification information included in the communication information.

8. The communication apparatus according to claim 1, wherein the device identification information is an IP address or a MAC address of a device.

9. The communication apparatus according to claim 1, wherein the access point identification information is an SSID of the access point.

10. A method of controlling a communication apparatus having a storage unit that stores device identification information identifying a device in association with access point identification information identifying an access point, the method comprising:

obtaining, from a device, communication information for communicating with the device;

specifying, from access point identification information stored in the storage unit, access point information corresponding to device identification information included in the communication information; and connecting to an access point indicated by the specified access point information, and executing communication between a device indicated by the device identification information included in the communication information and the communication apparatus.

11. The method of controlling the communication apparatus according to claim 10, further comprising determining whether or not access point identification information is included in the communication information, wherein, if it is determined that the access point identification information is not included in the communication information, an access point indicated by the specified access point information is connected to in the connecting, and if it is determined that the access point identification information is included in the communication information, an access point indicated by the access point identification information included in the communication information is connected to in the connecting.

12. The method of controlling the communication apparatus according to claim 10, further comprising, if communication with a device succeeds, associating and storing in the storage unit device identification information that identifies the device, and access point identification information that identifies an access point that is connected to when the communication succeeds.

13. The method of controlling the communication apparatus according to claim 10, wherein the communication information is obtained from an NFC tag that the device has in the obtaining.

14. The method of controlling the communication apparatus according to claim 10, wherein the communication apparatus is able to execute near field wireless communication, and the near field wireless communication is used in the obtaining to obtain the communication information from the device.

15. The method of controlling the communication apparatus according to claim 14, wherein the near field wireless communication is NFC.

16. The method of controlling the communication apparatus according to claim 10, wherein, in the communication, print data is transmitted to the device indicated by the device identification information included in the communication information.

17. The method of controlling the communication apparatus according to claim 10, wherein the device identification information is an IP address or a MAC address of a device.

18. The method of controlling the communication apparatus according to claim 10, wherein the access point identification information is an SSID of an access point.

19. A non-transitory computer-readable storage medium storing a program that causes a computer to execute a method of controlling a communication apparatus having a storage unit that stores device identification information identifying a device in association with access point identification information identifying an access point, the method comprising:

obtaining, from a device, communication information for communicating with the device;

specifying, from access point identification information stored in the storage unit, access point information corresponding to device identification information included in the communication information; and connecting to an access point indicated by the specified access point information, and executing communication between a device indicated by the device identification information included in the communication information and the communication apparatus.

* * * * *